United States Patent
Gorajala Chandra et al.

(10) Patent No.: US 11,464,046 B2
(45) Date of Patent: Oct. 4, 2022

(54) AIRTIME FAIRNESS IN WLANS (WIRELESS LOCAL ACCESS NETWORKS) BASED ON DYNAMIC UPDATES TO ATF (AIRTIME FAIRNESS) TOKENS

(71) Applicant: Fortinet, Inc., Sunnyvale, CA (US)

(72) Inventors: Sekhar Sumanth Gorajala Chandra, Fremont, CA (US); Yongcheng Lei, Pleasanton, CA (US)

(73) Assignee: Fortinet, Inc., Sunnyvale, CA (US)

( * ) Notice: Subject to any disclaimer, the term of this patent is extended or adjusted under 35 U.S.C. 154(b) by 30 days.

(21) Appl. No.: 17/218,071

(22) Filed: Mar. 30, 2021

(65) Prior Publication Data
US 2021/0289545 A1 Sep. 16, 2021

Related U.S. Application Data

(63) Continuation-in-part of application No. 16/236,641, filed on Dec. 31, 2018, now Pat. No. 10,716,027.

(51) Int. Cl.
| H04W 74/06 | (2009.01) |
| H04B 17/318 | (2015.01) |
| H04W 24/10 | (2009.01) |
| H04W 84/12 | (2009.01) |

(52) U.S. Cl.
CPC .......... *H04W 74/06* (2013.01); *H04B 17/318* (2015.01); *H04W 24/10* (2013.01); *H04W 84/12* (2013.01)

(58) Field of Classification Search
CPC ..... H04W 74/06; H04W 24/10; H04W 84/12; H04B 17/318
See application file for complete search history.

(56) References Cited

U.S. PATENT DOCUMENTS

2016/0183283 A1* 6/2016 Huang .............. H04W 72/1231
370/230
2017/0366467 A1 12/2017 Martin

* cited by examiner

*Primary Examiner* — Jianye Wu
(74) *Attorney, Agent, or Firm* — Law Office of Dorian Cartwright; Dorian Cartwright

(57) ABSTRACT

Responsive to the number of stations exceeding a first threshold number, the transmitting stations are prioritized relative to the station based on a station type. Responsive to the number of stations exceeding a second threshold number, the transmitting stations are prioritized relative to the station based on a station RSSI value. The station is assigned to the run queue with an ATF token responsive to being prioritized within the first or second thresholds permitting transmission of the data packet for the station. The station is assigned to a wait queue responsive to being prioritized outside of the first or second threshold not permitting transmission of the data packet for the station.

20 Claims, 5 Drawing Sheets

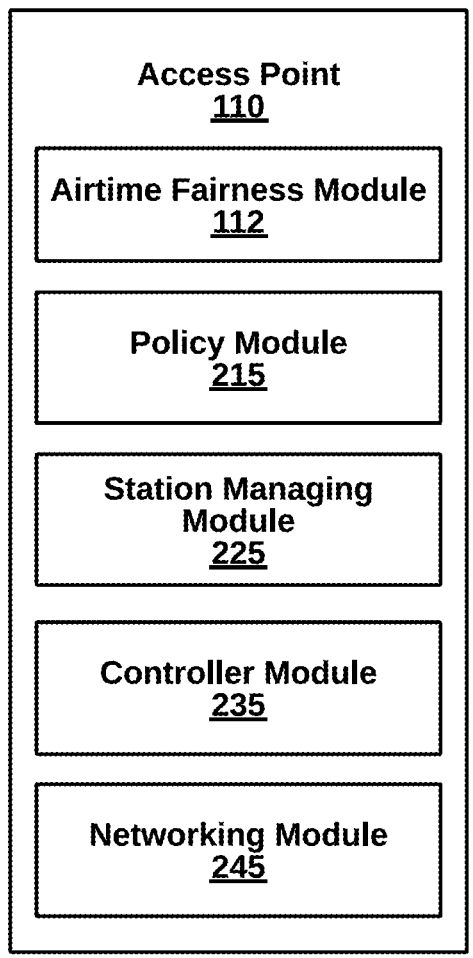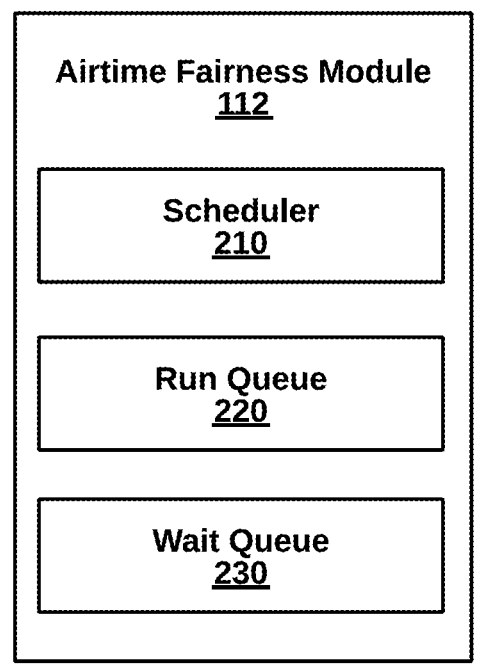
*FIG. 2A*  *FIG. 2B*

AIRTIME FAIRNESS IN WLANS (WIRELESS LOCAL ACCESS NETWORKS) BASED ON DYNAMIC UPDATES TO ATF (AIRTIME FAIRNESS) TOKENS

CROSS-REFERENCE TO RELATED APPLICATIONS

This application claims priority under 35 USC 120 as a continuation-in-part of pending U.S. application Ser. No. 16/236,641 filed Dec. 31, 2016, entitled EXTENDING AIRTIME FAIRNESS IN WLANS (WIRELESS LOCAL ACCESS NETWORKS) WITH SELECTIVE DYNAMIC ALLOCATIOUN OF QUANTUM by Ravikiran Malamkali et al. the contents of which being hereby incorporated in its entirety.

FIELD OF THE INVENTION

The invention relates generally to computer networking improvements, and more specifically, to dynamically updating airtime fairness (ATF) tokens for improved packet prioritizing during packet processing.

BACKGROUND

Wi-Fi standards continually evolve from legacy protocols such as IEEE (Institute of Electrical and Electronic Engineers) 802.11a, IEEE. 802.11b and IEEE 802.11g to newer protocols such as IEEE 802.11n and IEEE 802.11 ac. To this end, wireless stations leveraging newer protocols are able to receive better network performance due to higher throughput and other improved conditions.

Problematically, access points serving a heterogeneous mix of legacy wireless stations and newer wireless stations are slowed down by the legacy devices. To overcome this issue, many wireless vendors implemented airtime fairness in a vendor-specific manner for clients. One common technique is to allocate a time slot, or a quantum (measured in microseconds), to for channel access to each wireless station. The quantum is typically equal and constant for each client, allowing faster clients to have higher throughput within the quantum. On the other hand, there is no discrimination between different wireless stations.

In conventional round-robin token access schemes, stations are given access to the channel for a limited amount of equal time. However, once a number of connections at an access point is exceeds the capacity of a scheduler or operating system, the round-robin scheme is not applied and stations may have open access to the channel. As a result, slower transmitting stations can take control of the channel for long periods of time, slowing down faster transmitting stations.

Therefore, what is needed is a robust technique for dynamically updating airtime fairness (ATF) tokens for improved packet prioritizing during packet processing.

SUMMARY

These shortcomings are addressed by the present disclosure of methods, computer program products, and systems for dynamically updating ATF tokens for improved packet prioritizing during packet processing.

In one embodiment, a data packet concerning a station on the Wi-Fi network at a scheduler of the access point subject to a limited number of the ATF tokens for access to a channel for transmission of data packets between the Wi-Fi network and the data communication network is received. The station is not currently assigned to one of the ATE tokens. A number of transmitting stations assigned to a run queue that are currently assigned for permission to transmit with the ATF tokens is determined.

In another embodiment, responsive to the number of stations exceeding a first threshold number, the transmitting stations are prioritized relative to the station based on a station type. In yet another embodiment, responsive to the number of stations exceeding a second threshold number, the transmitting stations are prioritized relative to the station based on a station RSSI value.

The station is assigned to the run queue with an ATF token responsive to being prioritized within the first or second thresholds permitting transmission of the data packet for the station. The station is assigned to a wait queue responsive to being prioritized outside of the first or second threshold not permitting transmission of the data packet for the station.

Advantageously, network computer hardware performance and specifically, processing performance and network performance are improved for stations with the airtime fairness techniques.

BRIEF DESCRIPTION OF THE FIGURES

In the following figures, like reference numbers are used to refer to like elements. Although the following figures depict various examples of the invention, the invention is not limited to the examples depicted in the figures.

FIGS. 2A and 2B are more detailed diagrams illustrating internal components of an access point from the system of FIG. 1, according to some embodiments.

DETAILED DESCRIPTION

The present invention provides methods, computer program products, and systems for dynamically update airtime fairness (ATF) tokens for improved packet prioritizing during packet processing. One of ordinary skill in the art will recognize that many other scenarios are possible, given the present disclosure, as discussed in more detail below.

I. Systems to Dynamically Update ATF Tokens (FIGS. 1-2)

Figure 1:
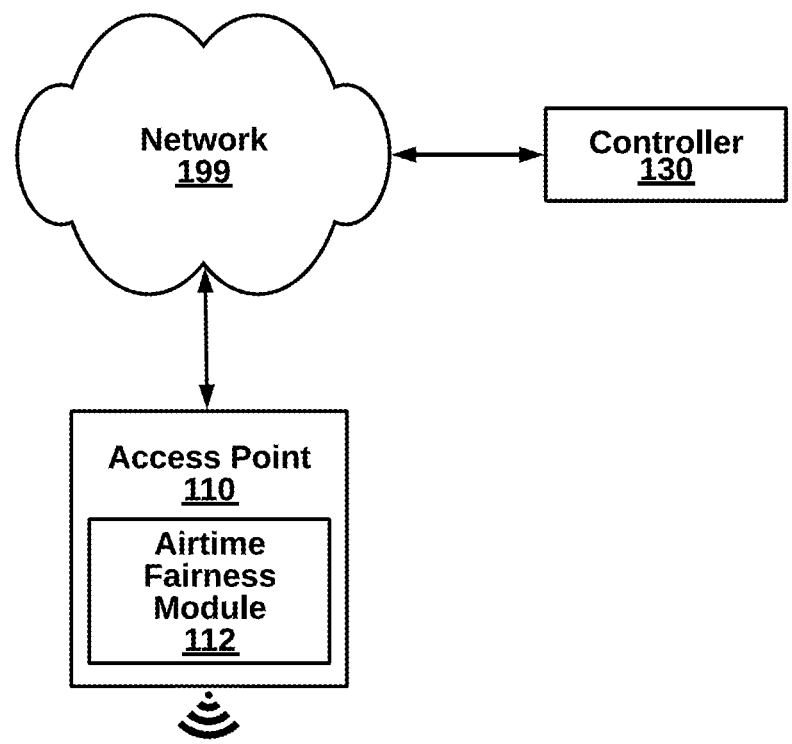
FIG. 1 is a high-level block diagram illustrating a system to dynamically update ATF tokens for improved packet prioritizing during packet processing, according to one embodiment.

FIG. 1 is a high-level block diagram illustrating a system 100 to dynamically update ATF tokens for improved packet prioritizing during packet processing, according to one embodiment. The system 100 comprises an access point 110, wireless stations 120A-C, and controller 130. Many other configurations are possible. For example, additional network components can also be part of the system 100, such as firewalls, virus scanners, routers, switches, application servers, databases, and the like. Each of the components in the system 100 are communicatively coupled through the network 199.

Network 199 can be the Internet, a WAN, a LAN, a Wi-Fi, or other type of data communication network providing a data channel for components of the system 100. Control of the network can be by a business organization, a government agency, or an individual household, without limitation to other possibilities. The components can use data channel protocols, such as IEEE 802.11a/b/g/, IEEE 802.11 n, 802.11ac, or other versions of the 802.11 and other wireless standards. Referring specifically to FIG. 1, the access point 110 is coupled across the network 199 preferably over wired connections. In turn, the stations 120A-C are coupled to the access point 110, preferably over wireless connections.

The access point 110 further comprises, in one embodiment, a dynamic airtime fairness module 112 to prioritize ATF tokens distributed to stations for channel access based on per-station characteristics. When a number of stations surpasses limitations of the access point 110, selective channel access can be continued in a controlled manner to maintain a high performance-level in the access point 110. For example, an operating kernel may limit ATF scheduling to 50 stations. Once 50 stations connect to the access point 110, or preferably sometime before reaching the maximum, stations 110A-C are prioritized based on characteristics such as protocol type and RSSI strength. Stations without channel access can be handed off to other nearby access points that are less congested.

In a more detailed example implementation of the dynamic airtime fairness module 112, a scheduler 210 is shown with a run queue 220 and a wait queue 230. The implementations can be in hardware, software, or a combination of both. The scheduler 210 includes a table of associating stations to assigned tokens. A dynamic table update policy can determine when a new station is assigned to a previously assigned token. Alternatively, tokens can be voluntarily returned to a pool when a station disconnects, times out, ended a session, and the like. The run queue 220 stores packets being processed for transmission according to an ATS or other channel access policy while the wait queue 230 stores packets waiting for a token assignment. One embodiment rejects data packets for stations without a current token assignment, and another embodiment stores these data packets until transmission is allowed. In an embodiment, the run queue 220 operates under a round robin channel access balancing. The wait queue 230 can have no channel access or a limited form of channel access, to prevent degrading performance for stations in the run queue 220.

One specific policy sets a first threshold for prioritizing by client type for remaining in the run queue 220 and low priority stations are sent to the wait queue 230. Once the run queue 220 is, for example, at 50% capacity, the existing stations may be prioritized by faster protocols from IEEE 802.11ax, IEEE 802.11ac, IEEE 802.11n, IEEE 802.11b, IEEE 802.11g, and IEEE 802.11a. Tokens can be reserved for faster protocols. Once the run queue 220 is, for example, at 75% capacity, the existing stations may be prioritized by RSSI from the strongest RSSI to the weakest. RSSI can be prioritized as a secondary factor to protocol, as a primary factor, or as a weighted factor. Many other factors and ranking algorithms can be substituted.

In other operations of the access point 110, as detailed in FIG. 2B, a policy module 205 govern interactions of the access point 110 a station managing module 225 handles connectivity with stations. Advertisement frames can be periodically broadcast informing nearby stations of services offered the access point 110. Stations desiring a connection send a probe request which is answered with a probe response to initiate an authentication protocol. If properly authenticated, connectivity is activated for access to the data communication network 199.

A controller module 235 communicates with a Wi-Fi controller for higher-level management, in an embodiment. Instructions and data about specific stations being centrally tracked by the Wi-Fi controller over different access point connections can affect scheduling priority decisions. For instance, historical connection data, network-wide security policies, and user or device access policies can be implemented locally when making scheduling decisions.

A networking module 245 can provide software protocols and physical access for the access point 110 to communication channels. For example, OSI layers in software encapsulate application data to data packets with headers and data. A transceiver sends and receives encoded digital signals over analog channels using Wi-Fi antennas, Ethernet wires and other appropriate hardware.

In an embodiment, the access point 110 off-loads airtime fairness determinations to the controller 130. From the perspective of the controller 130, performing airtime fairness determinations for multiple access points allows uniform implementation of network policies with standardized decision logic. In addition to the access point 110, there can be several other access points under management of the controller 130. By having contact with multiple access points, the controller 130 is able to track a specific user or a specific device as it moves around different rooms in a building services by different access points. The controller 130 can ensure consistent airtime performance for individual stations throughout the changes in location.

Figure 5:
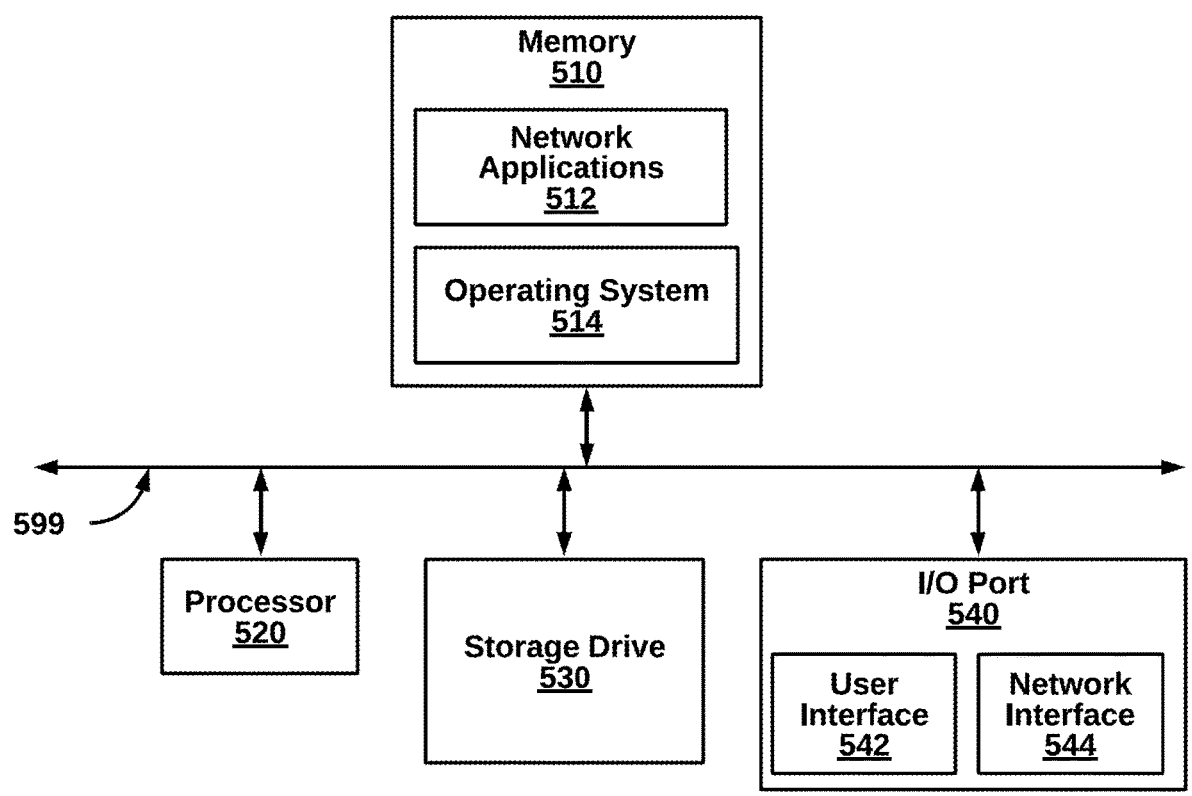
FIG. 5 is a block diagram illustrating an example computing device, according to one embodiment.

The access point 110 can be implemented in any of the computing devices discussed herein (e.g., see FIG. 5). For example, the access point 110 can be an AP 110 or AP 433 (modified as discussed herein) by Fortinet, Inc. of Sunnyvale, Calif. A network administrator can strategically place the access point 110 for optimal coverage area over a locale. The access point 110 can, in turn, be connected to a wired hub, switch or router connected to the enterprise network 199 (or an external network). In embodiment, access point functionality is incorporated into a switch or router. In another embodiment, the access point 110 is a virtual device in whole or in part.

The controller 130 can store a list of stations and factors that affect station prioritization, allowing uniform application of prioritization adjustments across the network. The access point 110 can first check with the controller 130 for existing determination of ATF adjustments. The access point 110 may make further ATF adjustments from local information or local factors, in one embodiment. The controller 130 can also offload parts of the ATF adjustments that could otherwise be performed locally. Many variations are possible. Additionally, the controller 130 can assist in handing-off stations stuck in the wait queue to nearby access points with less congestion.

Additionally, the controller 130 manages the access point 110 and controls stations as they traverse around the network. In one embodiment, a QoS is determined for a particular station while connected to access point 110 and continues to be the QoS when the same station subsequently associates with access points other than the access paint 110.

Additionally, the stations 130A-C of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5).

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5). No client configuration or download is needed for this particular technique, although a client app can be downloaded for optimizations.

II. Methods for Dynamically Updating ATF Tokens (FIGS. 3-4)

Figure 3:
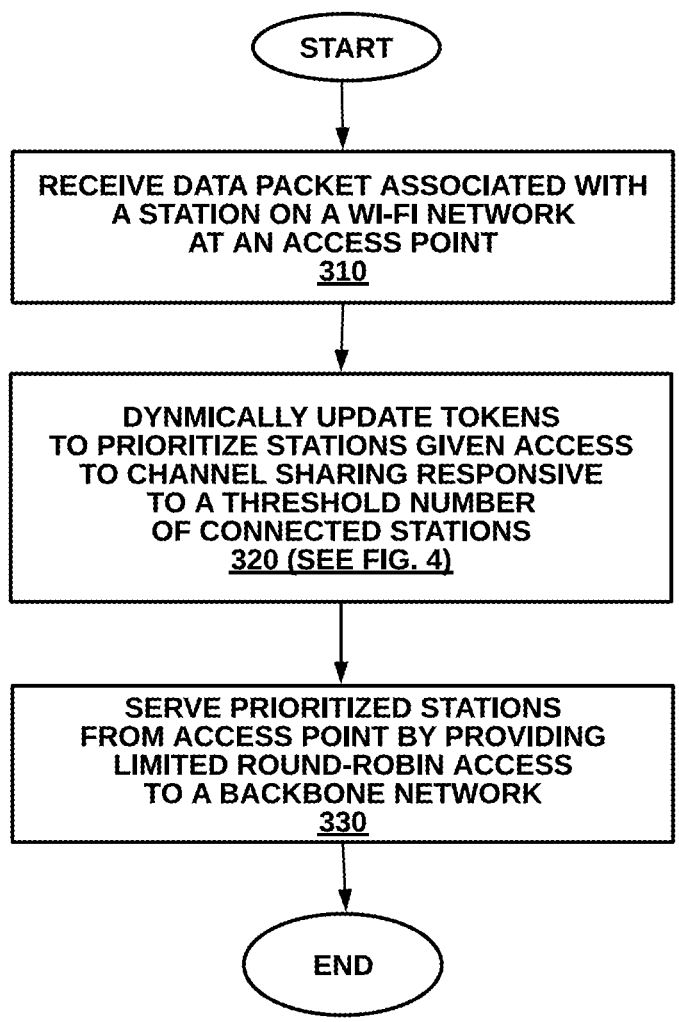
FIG. 3 is a high-level flow diagram illustrating a method for dynamically updating airtime fairness (ATF) tokens for improved packet prioritizing during packet processing, according to one embodiment.

FIG. 3 is a high-level flow diagram illustrating a method 300 for dynamically updating airtime fairness (ATF) tokens for improved packet prioritizing during packet processing, according to one embodiment. The method 300 can be implemented by the system 100 of FIG. 1 or a different system. One of ordinary skill in the art will recognize that the method 300 is non-limiting as other embodiments can have more or less steps and can be performed in a different order.

At step 310, a data packet concerning a station on a Wi-Fi network is received at an access point. At step 320, ATF tokens are dynamically updated to prioritize stations for channel access, responsive to a threshold number of station connections, as described more fully below in association with FIG. 4. At step 330, the access point serves the prioritized stations by providing access to a backbone network (e.g., the Internet or a wide area network). Stations assigned to the run queue are granted channel access according to a round robin token scheduling scheme. Other sharing schemes are possible. Additional factors and algorithms for prioritizing can also be implemented.

Figure 4:
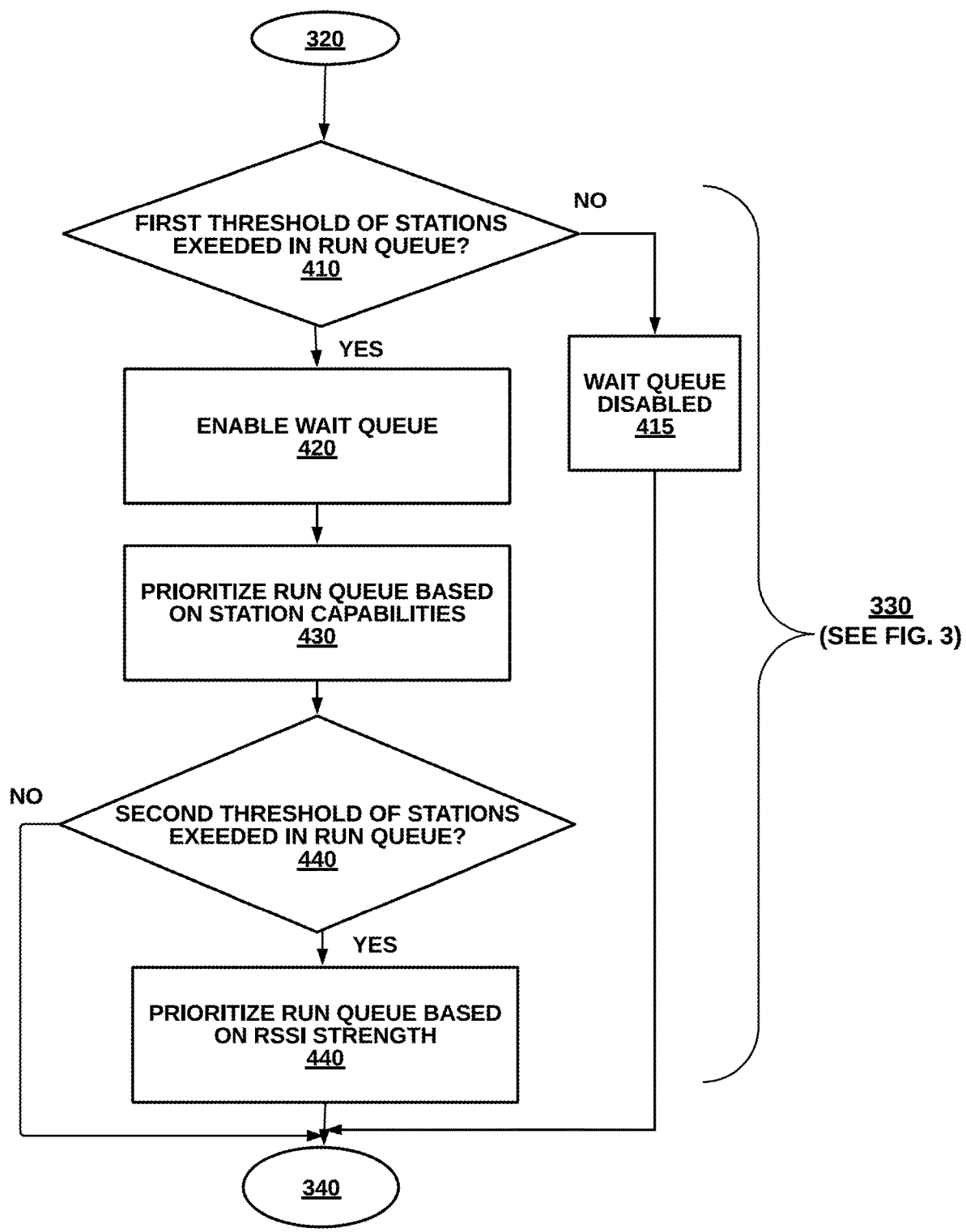
FIG. 4 is a more detailed flow diagram illustrating a step for assigning ATF tokens, from the method of FIG. 3, according to one embodiment.

FIG. 4 is a more detailed flow diagram illustrating the step 320 for dynamically updating ATF tokens to prioritize stations given access to round robin channel sharing, from the method of FIG. 3, according to one embodiment.

At step 410 (following step 310 of FIG. 3), responsive to a number of transmitting stations assigned to the access point exceeding a first threshold, a wait queue is enabled, at step 420. Stations assigned to the wait queue are periodically reevaluated for the run queue. There can be a minimum period for reevaluation to prevent thrashing, and there can be a maximum period for stations in the wait queue to prevent zero channel access. In one optional embodiment, stations assigned to the wait queue are handed-off to less congested access points. While waiting there can be no channel access or very limited channel access. Responsive to the number of transmitting station not exceeding the first threshold, the wait queue is disabled at step 415.

At step 430, stations are prioritized based on transmission capabilities to determine which receive tokens for transmission. Priority can be by type of protocol, actual uplink or downlink speeds, processor loads of stations, a type of device (e.g., laptop, smartphone, IoT device) or user of a station.

At step 440, responsive to the number of transmitting stations assigned to the access point exceeding a second threshold, prioritizing the stations based on RSSI strength.

The process then returns to step 330 of FIG. 3.

III. Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the access point 110 and the wireless stations 120A-C. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device, The computing device 500, of the present embodiment, includes a memory 510, a processor 520, a storage drive 530, and an I/O port 540. Each of the components is coupled for electronic communication via a bus 599. Communication can be digital and/or analog and use any suitable protocol.

The memory 510 further comprises network applications 512 and an operating system 514. The network applications 512 can include the modules of the access point 110 and the wireless stations 120A-C, as illustrated in FIGS. 1-2. Other network applications 512 can include a web browser, a mobile application, an application that uses networking, a remote application executing locally, a network protocol application, a network management application, a network routing application, or the like, The operating system 514 can be one of the Microsoft Windows® family of operating systems (e.g., Windows 95, 90, Me, Windows NT, Windows 2000, Windows XP, Windows XP x74 Edition, Windows Vista, Windows CE, Windows Mobile, Windows 10, Windows 7 or Windows 8), Linux, HP-UX, UNIX, Sun OS, Solaris, Mac OS N, Alpha OS, AIX, IRIX32, or IRIX74. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point coupled to a plurality of wireless stations over a Wi-Fi network for providing access to a data communication network, the method for dynamically updating airtime fairness (ATF) tokens for improved packet prioritizing during packet processing, the method comprising:
   receiving a data packet concerning a station on the Wi-Fi network at a scheduler of the access point subject to a limited number of the ATF tokens for access to a channel for transmission of data packets between the Wi-Fi network and the data communication network, wherein the station is not currently assigned to one of the ATF tokens;
   determining a number of transmitting stations assigned to a run queue that are currently assigned for permission to transmit with the ATF tokens;
   responsive to the number of stations exceeding a first threshold number, prioritizing the transmitting stations relative to the station based on a station type;
   responsive to the number of stations exceeding a second threshold number, prioritizing the transmitting stations relative to the station based on a station RSSI value;
   assigning the station to the run queue with an ATF token responsive to being prioritized within the first or second thresholds permitting transmission of the data packet for the station; and
   assigning the station to a wait queue responsive to being prioritized outside of the first or second threshold not permitting transmission of the data packet for the station.

2. The method of claim 1, further comprising:
   responsive to being assigned to the wait queue, checking a station RSSI value relative to a neighboring access point; and
   responsive to the neighboring station RSSI value exceeding the station RSSI value, steering the station to the neighboring access point.

3. The method of claim 1, further comprising:
   responsive to being assigned to the wait queue, checking a number of connected stations relative to a neighboring access point; and
   responsive to the neighboring access point connection number of connected stations being less than the access point connected number, steering the station to the neighboring access point.

4. The method of claim 1, wherein the ATF token is assigned to the station for a minimum period of time, regardless of subsequent prioritizations.

5. The method of claim 1, wherein the station is assigned to the run queue after being assigned to the wait queue for a maximum period of time, regardless of prior prioritizations.

6. The method of claim 1, wherein an operating system executing on the access point governs the limited number of ATF tokens.

7. The method of claim 1, wherein the second threshold number is higher than the first threshold number.

8. A non-transitory computer-readable medium in an access point to, when executed by a processor, perform a computer-implemented method for providing access to a data communication network, the method for dynamically updating airtime fairness (ATF) tokens for improved packet prioritizing during packet processing, the method comprising:
   receiving a data packet concerning a station on the Wi-Fi network at a scheduler of the access point subject to a limited number of the ATF tokens for access to a channel for transmission of data packets between the Wi-Fi network and the data communication network, wherein the station is not currently assigned to one of the ATF tokens;
   determining a number of transmitting stations assigned to a run queue that are currently assigned for permission to transmit with the ATF tokens;
   responsive to the number of stations exceeding a first threshold number, prioritizing the transmitting stations relative to the station based on a station type;
   responsive to the number of stations exceeding a second threshold number, prioritizing the transmitting stations relative to the station based on a station RSSI value;
   assigning the station to the run queue with an ATF token responsive to being prioritized within the first or second thresholds permitting transmission of the data packet for the station; and
   assigning the station to a wait queue responsive to being prioritized outside of the first or second threshold not permitting transmission of the data packet for the station.

9. The method of claim 8, further comprising:
responsive to being assigned to the wait queue, checking a station RSSI value relative to a neighboring access point; and
responsive to the neighboring station RSSI value exceeding the station RSSI value, steering the station to the neighboring access point.

10. The method of claim 8, further comprising:
responsive to being assigned to the wait queue, checking a number of connected stations relative to a neighboring access point; and
responsive to the neighboring access point connection number of connected stations being less than the access point connected number, steering the station to the neighboring access point.

11. The method of claim 8, wherein the ATF token is assigned to the station for a minimum period of time, regardless of subsequent prioritizations.

12. The method of claim 8, wherein the station is assigned to the run queue after being assigned to the wait queue for a maximum period of time, regardless of prior prioritizations.

13. The method of claim 8, wherein an operating system executing on the access point governs the limited number of ATF tokens.

14. The method of claim 8, wherein the second threshold number is higher than the first threshold number.

15. An access point to access to a data communication network, to dynamically update airtime fairness (ATF) tokens for improved packet prioritizing during packet processing, the access point comprising:
a processor;
a network interface, communicatively coupled to the processor and to the data communication network; and
a memory to store:
a scheduler having a run queue and a wait queue;
a receiving module to receive a data packet concerning a station on the Wi-Fi network at a scheduler of the access point subject to a limited number of the ATF tokens for access to a channel for transmission of data packets between the Wi-Fi network and the data communication network, wherein the station is not currently assigned to one of the ATF tokens;
a determining module to determine a number of transmitting stations assigned to the run queue that are currently assigned for permission to transmit with the ATF tokens;
a first prioritizing module to, responsive to the number of stations exceeding a first threshold number, prioritize the transmitting stations relative to the station based on a station type;
a second prioritizing module to, responsive to the number of stations exceeding a second threshold number, prioritize the transmitting stations relative to the station based on a station RSSI value;
an assigning module to assign the station to the run queue with an ATF token responsive to being prioritized within the first or second thresholds permitting transmission of the data packet for the station, wherein the assigning module assigns the station to the wait queue responsive to being prioritized outside of the first or second threshold not permitting transmission of the data packet for the station.

16. The access point of claim 15, further comprising:
responsive to being assigned to the wait queue, checking a station RSSI value relative to a neighboring access point; and
responsive to the neighboring station RSSI value exceeding the station RSSI value, steering the station to the neighboring access point.

17. The access point of claim 15, further comprising:
responsive to being assigned to the wait queue, checking a number of connected stations relative to a neighboring access point; and
responsive to the neighboring access point connection number of connected stations being less than the access point connected number, steering the station to the neighboring access point.

18. The access point of claim 15, wherein the ATF token is assigned to the station for a minimum period of time, regardless of subsequent prioritizations.

19. The access point of claim 15, wherein the station is assigned to the run queue after being assigned to the wait queue for a maximum period of time, regardless of prior prioritizations.

20. The access point of claim 15, wherein the second threshold number is higher than the first threshold number.

* * * * *